United States Patent
Hafeez et al.

(10) Patent No.: US 6,304,618 B1
(45) Date of Patent: Oct. 16, 2001

(54) METHODS AND SYSTEMS FOR REDUCING CO-CHANNEL INTERFERENCE USING MULTIPLE TIMINGS FOR A RECEIVED SIGNAL

(75) Inventors: Abdulrauf Hafeez, Ann Arbor, MI (US); Karl J. Molnar; Gregory E. Bottomley, both of Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/143,821

(22) Filed: Aug. 31, 1998

(51) Int. Cl.$^7$ .............................. H03D 1/00; H04L 27/06
(52) U.S. Cl. ............................................ 375/341; 375/262
(58) Field of Search ..................................... 375/341, 265, 375/262; 714/792, 793, 794, 795, 796, 786

(56) References Cited

U.S. PATENT DOCUMENTS

| | | | |
|---|---|---|---|
| 5,263,053 | 11/1993 | Wan et al. | 375/58 |
| 5,506,861 | 4/1996 | Bottomley | 375/200 |
| 5,537,443 | 7/1996 | Yoshino et al. | 375/340 |
| 5,583,886 | 12/1996 | Rohani et al. | 375/227 |
| 5,619,503 | 4/1997 | Dent | 370/330 |
| 5,640,432 | 6/1997 | Wales | 375/346 |
| 5,727,032 | * 3/1998 | Jamal et al. | 375/347 |
| 5,790,606 | 8/1998 | Dent | 375/348 |
| 5,818,876 | * 10/1998 | Love | 375/341 |
| 5,889,827 | * 3/1999 | Bottomley et al. | 375/350 |
| 6,148,431 | * 11/2000 | Lee et al. | 714/794 |

FOREIGN PATENT DOCUMENTS

WO 98/26544   6/1998   (WO).

OTHER PUBLICATIONS

Hafeez et al., Co–Channel Interference Cancellation for D–AMPS Handsets, Proceedings of the 1999 IEEE 49$^{th}$ Vehicular Technology Conference, Houston, TX, vol. 2, May 16–20, 1999, p. 1026–1031.

Chugg, "Acquisition Performance of Blond Sequence Detectors Using Per–Survivor Processing", 1997 IEEE Veh. Technol. Conf. May 1997, pp. 539–543.

Giridhar et al, "Joint Estimation Algorithms for Cochannel Signal Demodulation", IEEE, 1993, pp. 1497–1501.

Giridhar et al., "Nonlinear Techniques for the Joint Estimation of Cochannel Signals", IEEE Transactions on Communications, vol. 45, No. 4, Apr. 1997, pp. 473–484.

(List continued on next page.)

*Primary Examiner*—Chi Pham
*Assistant Examiner*—Phuong Phu
(74) *Attorney, Agent, or Firm*—Myers Bigel Sibley & Sajovec

(57) ABSTRACT

A plurality of timings are estimated for a received signal wherein the plurality of timings correspond to a plurality of transmitted signals. The received signal is then sampled in accordance with the plurality of timings, to produce a plurality of sample streams from the received signal. Channel estimates are produced for the plurality of transmitted signals and metrics are computed using the sample streams and the channel estimates. Information symbols corresponding to the transmitted signals are detected by using the metrics. Accordingly, by using multiple timings for a received signal, rather than using a common timing, the number of channel taps that are used may be reduced and the accuracy of symbol detection may be increased. The channel estimates may be produced by generating pulse-shape information and producing channel estimates for the multiple transmitted signals using the received signal and the pulse-shape information. Channel estimates may be produced that correspond to a plurality of symbol sequence hypotheses. Channel estimates may be updated using an error signal.

83 Claims, 4 Drawing Sheets

OTHER PUBLICATIONS

Gooch et al., "Demodulation of Cochannel QAM Signals", IEEE, 1989, pp. 1392–1395.

Lo et al., "Equalization and CCI Cancellation for Wireless Communications Using Blond Trellis Search Techniques", IEEE Veh. Technol. Conf., 1998.

Murata et al., "Maximum–Likelihood Sequence Estimation for Coded Modulation in the Presence of Co–Channel Interference and Intersymbol Interference", IEEE Veh. Technol. Conf., Apr. 1996, pp. 701–705.

Raheli et al., "Per–Survivor Processing: A General Approach to MLSE in Uncertain Environments", IEEE Transactions on Communications, vol. 43, No. 2/3/4/, Feb./Mar./Apr. 1995, pp. 354–364.

Ranta et al., "Co–Channel Interference Cancelling Receiver for TDMA Mobile Systems", IEEE Intl. Conf. Commun., 1995, pp. 17–21.

Stojanovic et al., "Multichannel Processing of Broad–band Multiuser Communication Signals in Shallow Water Acoustic Channels", IEEE, Journal of Oceanic Engineering, vol. 21, No. 2, Apr. 1996, pp. 156–166.

Ungerboeck, "Adaptive Maximum–Likelihood Receiver for Carrier –Modulated Data–Transmission Systems", IEEE Transactions on Communications, vol. Com–22, No. 5, May 1974, pp. 624–636.

Van Etten, "Maximum Likelihood Receiver for Multiple Channel Transmission Systems", IEEE Transactions on Communications, Feb. 1996, 276–283, Wales, "Technique for Cochannel Interference Suppression in TDMA Mobile Radio Systems", IEE Proc. Commun. vol. 142, No. 2, Apr. 1995, pp. 106–114.

Yokota et al., "MLSE Multiple Co–channel Interference Canceling With Channel Estimation for Future Mobile Radios", IEEE, 1995, pp. 753–757.

Yoshino et al., "Interference Canceling Equalizer (ICE) for Mobile Radio Communication", IEEE Transactions on Vehicular Technology, vol. 46, No. 4, Nov. 1997, pp. 849–861.

* cited by examiner

METHODS AND SYSTEMS FOR REDUCING CO-CHANNEL INTERFERENCE USING MULTIPLE TIMINGS FOR A RECEIVED SIGNAL

FIELD OF THE INVENTION

The present invention relates to digital communications, and more particularly to reception of co-channel signals in digital communications.

BACKGROUND OF THE INVENTION

Bandwidth is a valuable resource in wired and wireless communication systems. Frequency may be reused in a wireless network in order to reduce cost. A signal occupying the same bandwidth as a desired signal, referred to herein as a co-channel signal, may cause interference and may severely limit the performance of a conventional single-user receiver. Moreover, a transmitted signal may travel along several paths to arrive at the receiver in a wireless environment. This multipath propagation may also give rise to signal fading and inter-symbol interference.

The effects of Co-Channel Interference (CCI) and Inter-Symbol Interference (ISI) can be reduced by using joint equalization/interference cancellation at a receiver. Among the various approaches, which include linear filtering and decision feedback, Joint Maximum likelihood Sequence Estimation (JMLSE) of co-channel signals may provide superior performance. See for example, Ranta et al, "*Co-Channel Interference Cancelling, Receiver for TDMA Mobile Systems*", IEEE ICC Proceedings, February 1995, pp. 17–21. However, Ranta's approach may only be applicable to stationary channels (stationary over a data burst). Unfortunately, radio signals in mobile communication systems generally undergo Doppler shift caused by vehicular motion. When data bursts are long, this generally results in time-varying signal fading. Yoshino et al. propose joint adaptive channel estimation and demodulation in Yoshino et al., "*Interference Canceling Equalizer (ICE) for Mobile Radio Communication*". IEEE Trans. Vehicular Tech., Vol. 46, No. 4, November 1997, pp. 849–861.

The receivers proposed in the above-mentioned publications obtain co-channel impulse response estimates jointly with the aid of training sequences of synchronized co-channel signals. In current Time Division Multiple Access (TDMA) cellular radiotelephone systems like GSM and D-AMPS, co-channel signals are not synchronized in either link. Thus, joint training may not be readily used for channel estimation. However, it is possible to exploit the training sequences of individual signals. One such technique which utilizes the training sequences of all signals is described in Wales, "*Technique for Cochannel Interference Suppression in TDMA Mobile Radio Systems*", IEEE Proc. Comm., Vol. 142, No. 2, April 1995. This technique is also generally applicable to stationary channels.

Giridhar et al. propose adaptive joint MLSE and MAPSD algorithms which can estimate channel responses blindly without requiring any training in Giridhar et al., "*Nonlinear Techniques for the Joint Estimation of Cochannel Signals*", IEEE Trans. Comm., Vol. 45, No. 4, April 1997, pp. 473–483. They use a technique called Per-Survivor Processing (PSP) which involves parallel channel state feedback in the recursion of an MLSE processor. PSP can provide an effective alternative to conventional adaptive algorithms that employ a single channel estimator. However, the acquisition performance of PSP-based MLSE receivers may have limitations as described in Chugg, "*Acquisition Performance of Blind Sequence Detectors Using Per-Survivor Processing*", IEEE VTC Proceedings, Vol. 2, May 1997, pp. 539–543.

In a TDMA system, each co-channel signal may be subject to an overall channel impulse response which comprises a transmit pulse-shaping filter, a dispersive medium and a receive filter matched to the transmit pulse-shaping filter. The transmit and receive filter responses are known a priori and can thus be used to constrain the overall channel impulse responses. In the case of asynchronous co-channel signals, ringing arising from sampling offsets may increase the number of channel taps to be modeled. Estimation error generally rises as the number of taps being estimated increases.

SUMMARY OF THE INVENTION

It is therefore an object of the present invention to provide improved receivers and receiving methods that can reduce and preferably cancel co-channel interference.

It is another object of the present invention to provide receivers and receiving methods that can reduce co-channel interference without requiring an undue increase in the number of channel taps to be modeled.

These and other objects are provided, according to the present invention by estimating multiple timings for a received signal and sampling the received signal in accordance with the multiple timings, to produce multiple sample streams. The multiple sample streams are then used to detect information symbols. By generating and using the multiple timings and samplings of the received signals, efficient detection of information symbols may be obtained, without requiring undue increase in the number of taps that are being estimated. Reduction and preferably cancellation of co-channel interference can thereby be obtained.

More specifically, according to the present invention, a plurality of timings are estimated for a received signal wherein the plurality of timings correspond to a plurality of transmitted signals. The received signal is then sampled in accordance with the plurality of timings, to produce a plurality of sample streams from the received signal. Channel estimates are produced for the plurality of transmitted signals, and metrics are computed using the sample streams and the channel estimates. Information symbols corresponding to the transmitted signals are detected by using the metrics. Accordingly, by using multiple timings for a received signal, rather than using a common timing, the number of channel taps that are used may be reduced and the accuracy of symbol detection may be increased.

The multiple timings may be estimated for the received signal by correlating the received signal to at least one symbol sequence. Alternatively, a timing may be hypothesized and metrics may be computed that are associated with the hypothesized timing. The sampling may obtain a single sample per symbol period of the received signal in accordance with the multiple timings. Alternatively, the sampling may obtain multiple samples per symbol period of the received signal in accordance with the multiple timings.

The channel estimates may be produced by generating pulse-shape information and producing channel estimates for the multiple transmitted signals using the received signal and the pulse-shape information. Alternatively, channel estimates may be produced that correspond to a plurality of symbol sequence hypotheses. Channel estimates may be updated using an error signal.

The metrics may be computed by filtering the sample streams with the channel estimates to provide multiple filter outputs. One filter or multiple filters may be used. The filter outputs may then be used to compute the metrics. Alternatively, the metrics may be computed by estimating received values using the channel estimates and the hypothesized symbols, and computing the metrics using the estimated received values.

Finally, the information symbols may be detected by storing path information that is associated with a plurality of paths, and extending the paths by hypothesizing symbol values and computing metrics. Paths may be discarded based on the metrics or based on the metrics and a state space.

According to another aspect of the invention, a receiver can reduce the number of channel taps to be modeled by using pulse-shape information for the received signal. When the pulse shape information is used, a common timing and sampling may be used. However, as described above, the pulse-shape information may be used with multiple timings and samplings as well. Pulse shaping information may be obtained from the amount of ringing that is included in a received pulse. By using the pulse shape information, channel taps may be reduced.

More specifically, pulse-shape information is generated for a received signal. Channel estimates are produced for a plurality of transmitted signals using the received signal and the pulse-shape information. Metrics are computed using the received signal and the channel estimates, and information symbols are detected corresponding to the plurality of transmitted signals using the metrics. The channel estimates may be produced, the metrics may be computed and the information symbols may be detected, as was described in detail above.

According to yet another aspect of the present invention, "semi-blind" acquisition of signals may be used when the information set corresponding to one signal is known, for example because the signal includes a synchronization word. Accordingly, timings may be estimated and samples may be obtained, as described above. However, the channel estimates may be initialized for the plurality of transmitted channels and the metrics may be initialized for the sample streams based on the known information symbols. Updated metrics may then be computed using the sample streams, the initialized channel estimates and the initialized metrics, and information symbols may be detected corresponding to at least one of the transmitted signals, using the updated metrics. The channel estimates may then be updated using the updated metrics. Estimating, initializing, computing metrics and detecting information symbols may be performed as described above.

Accordingly, receivers and receiving methods may be provided that can reduce and preferably cancel co-channel interference using multiple timings and/or pulse-shape information and/or known information symbol information. The number of channel taps to model may be reduced, to thereby allow reduced estimation errors.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
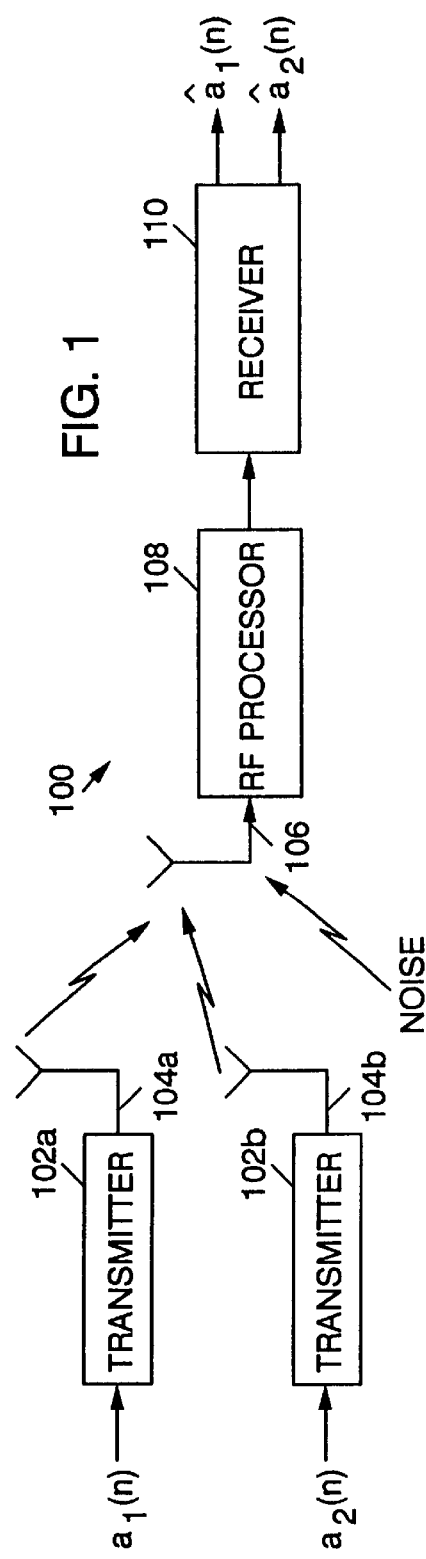
FIG. 1 is a block diagram of a digital wireless communication system according to the invention.

The present invention will be described in the context of wireless communication. However, the invention is applicable to any communication system or storage device. FIG. 1 illustrates a digital wireless communication system 100 in which the present invention may be utilized. Digital information symbols $a_1(n)$ are passed to a transmitter 102a, which converts the symbol stream into a radio waveform for transmission using antenna 104a. A second transmitter 102b converts a second independent symbol stream $a_2(n)$ into a radio waveform for transmission using antenna 104b. The two radio signals occupy the same frequency band, though with a possible small frequency offset, and are received by antenna 106. It will be understood that although a single antenna 106 is illustrated, multiple antennas such as diversity antennas may be used. The received signal is processed by a radio frequency (RF) processor 108, which preprocesses the signal for example by filtering, amplifying, mixing and sampling the signal appropriately, giving rise to a sequence of received samples. Preferably, the filtering is matched to the transmit filter. The data samples are processed in receiver 110 to produce estimated digital information sequences $â_1(n)$ and $â_2(n)$ corresponding to transmitted sequences $a_1(n)$ and $a_2(n)$ respectively.

Figure 2:
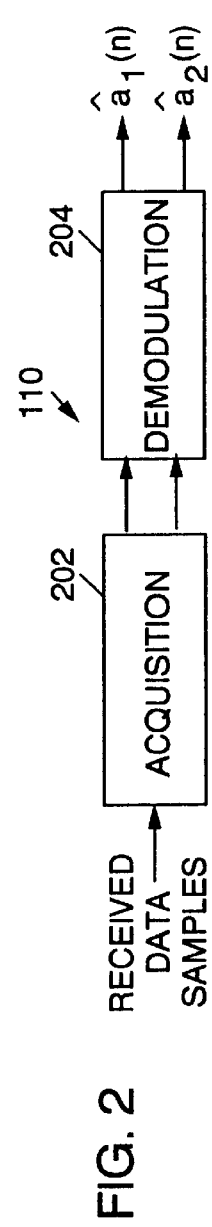
FIG. 2 illustrates an embodiment of receivers and receiving methods according to the present invention.

FIG. 2 illustrates receiving systems and methods 110 in accordance with the present invention. The receiving systems and methods 110 perform two operations: acquisition and demodulation. Acquisition 202 jointly estimates certain channel parameters of co-channel signals and downsamples received data samples appropriately depending on the implementation. Demodulation 204 jointly estimates transmitted information sequences using the channel parameters and data samples provided by acquisition 202. It will be understood that acquisition 202 and demodulation 204 may be embodied using one or more analog or digital integrated circuits, integrated circuit microprocessors that run a stored program, Application-Specific Integrated Circuits (ASIC), or any other combination of hardware and/or software.

Figure 3:
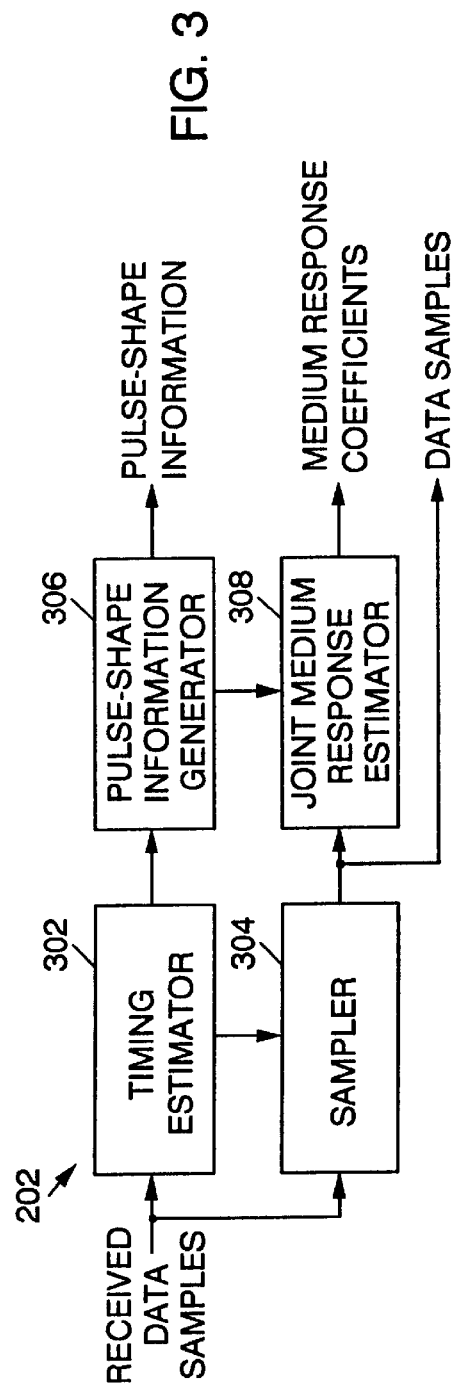
FIG. 3 illustrates an embodiment of acquisition according to the present invention.

An exemplary embodiment of acquisition 202 according to the present invention is illustrated in FIG. 3. As shown, acquisition 202 includes a timing estimator 302, a sampler 304, a pulse-shape information generator 306 and a joint medium response estimator 308. The received data samples are input to timing estimator 302 and sampler 304. An output of the timing estimator is coupled to pulse-shape information generator 306 and another output is coupled to sampler 304. An output of sampler 304 and an output of pulse-shape information generator 306 are coupled to joint medium response estimator 308. The joint medium response estimator produces estimates of the co-channel medium responses, referred to as medium response coefficients.

Figure 4:
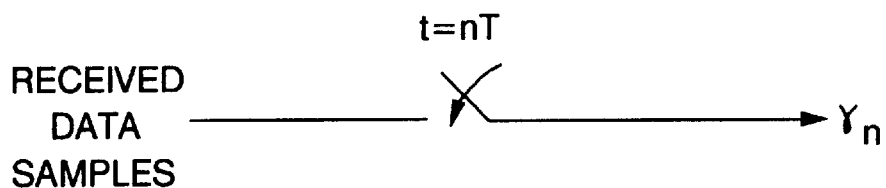
FIG. 4 illustrates an embodiment of sampling according to the present invention.

Timing estimator 302 determines the timing of all co-channel signals. One approach is to correlate the received data samples with respective training sequences. Sampler 304 down-samples the received data signal to K samples per symbol (rate K/T) according to the timing of the desired signal as shown in FIG. 4, where T is the symbol period and K is typically 1 or 2. While the present invention is explained in terms of 1 sample per symbol, it will be apparent to one of ordinary skill in the art that the present invention can be used with multiple samples per symbol. Pulse-shape information generator 306 generates the sampled autocorrelation function ρ of the pulse-shaping filters, i.e.

$$\rho_{k,j} = f^*(-t) \otimes f(t)|_{t-jT-\tau_k} \quad (1)$$

where '$\otimes$' denotes the convolution operation and '$|$' denotes the sampling operation. In Equation (1), f(t) is the transmit or receive pulse-shaping filter (same for all signals) and $\tau_k$ is the delay (modulo T) of the kth signal as compared to the first signal. The number of samples (index j) generated is equal to the number of taps used to model each signal. Since f(t) is fixed, the function ρ can be pre-computed and stored in memory for all possible delay values. The proper sample values can be read from generator memory depending on the timing estimates provided by timing estimator 302.

Figure 8:
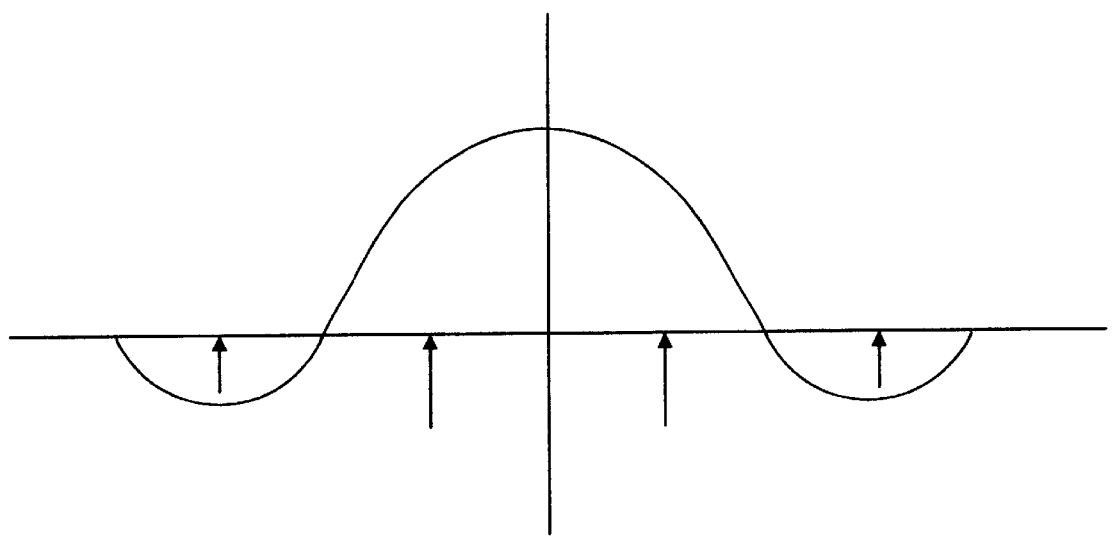
FIG. 8 illustrates the use of pulse-shape information according to the invention.

FIG. 8 graphically illustrates the use of pulse-shape information by pulse-shape information generator 306. More specifically, FIG. 8 graphically illustrates a pulse in which there is one ray or image of the signal. Because of transmit and receive filters, the image of each symbol "rings" as illustrated in FIG. 8. If sampling occurs as shown by the arrows, then it will appear that there are four images or echoes of the symbol when, in reality, there is only one. By exploiting knowledge of the ringing pattern (pulse-shape autocorrelation), the receiver can recognize that there is only one image and only estimate one channel coefficient, not four.

Finally, joint medium response estimator 308 jointly estimates the medium responses of the co-channel signals. Let $\{r_n\}$ be the sequence of data samples at the output of the sampler 304. Assume Nyquist pulse-shaping and flat Rayleigh fading for both signals. Then, the data sequence can be modeled as $$r_n = \underline{g}_n^H \Phi \underline{a}_n + w_n \quad (2)$$

where $\underline{g}_n = [g_1(n), g_2(n)]^H$ is the vector of medium responses, $w_n$ is a sample of an additive white Gaussian noise process with zero mean and finite variance, $\underline{a} = [a_1(n), a_2(n), a_2(n+1), a_2(n-1)]^T$ and $\Phi$ is the pulse autocorrelation matrix, given by $$\Phi = \begin{bmatrix} 1 & 0 & 0 & 0 \\ 0 & \rho_{2,-1} & \rho_{2,0} & \rho_{2,1} \end{bmatrix} \quad (3)$$

where it is assumed that $\rho_{2j}$ has zero (or negligible) energy for j>1 and j<−1. Thus, the sampled autocorrelation function for the second signal (which is not sampled at the peak of its autocorrelation function) can be completely modeled using three values.

If medium responses $g_n$ are known a priori, the joint maximum likelihood sequence based on the model of Equation (2) can be determined as the sequence $\{\hat{a}_1(n), \hat{a}_2(n)\}$ n=1 to N that minimizes the metric:

$$J_N = \sum_{n=1}^{N} \| r_n - \underline{g}_n^H \Phi \hat{\underline{a}}_n \|^2 \quad (4)$$

The metric can be computed recursively by using the Viterbi algorithm, for example as described in van Etten, *Maximum-Likelihood Receiver for Multiple Channel Transmission Systems*", IEEE Trans. Comm., February 1976, pp. 276–283, and the references therein, as follows:

$$J_n = J_{n-1} + \| e(\sigma_n | \sigma_{n-1}) \|^2 \quad (5)$$

where $\sigma_n = \{\hat{a}_2(n), \hat{a}_2(n-1)\}$ represents the state at time n and $e(\sigma_n | \sigma_{n-1})$ represents branch metrics (or error), given by:

$$e(\sigma_n | \sigma_{n-1}) = r_n - \underline{g}_n^H \Phi \hat{\underline{a}}_n. \quad (6)$$

If medium responses are unknown a priori, branch metrics can be computed as $$e(\sigma_n | \sigma_{n-1}) = r_n - \hat{\underline{g}}_n^H(\sigma_{n-1}) \Phi \hat{\underline{a}}_n \quad (7)$$

where $\hat{\underline{g}}_n(\sigma_{n-1})$ are medium response estimates conditioned on the survivor sequence associate with state $(\sigma_{n-1})$. With Least Mean Square (LMS) channel identification, medium response update is performed according to $$\hat{\underline{g}}_{n+1}(\sigma_n) = \hat{\underline{g}}_n(\sigma_{n-1}) + \mu \Phi \hat{\underline{a}}_n e^*(\sigma_n | \sigma_{n-1}) \quad (8)$$

where μ is a constant called step size. Note that other forms of channel identification including Recursive Least Squares (RLS) or Kalman LMS (KLMS) can also be used for channel update. This describes joint channel tracking for multiple user signals using pulse-shape side information. Single user channel tracking with side information is disclosed in pending U.S. application Ser. No. 09/007,936, filed Jan. 16, 1998 to Molnar et al., entitled "Methods and Apparatus for Channel Tracking", the disclosure of which is incorporated herein by reference.

The aspect of keeping channel estimates associated with the states of an MLSE processor is referred to as Per-Survivor Processing (PSP). See for example Raheli, et al., "*Per-Survivor Processing: A General Approach to MLSE in Uncertain Environments*" IEEE Trans. Comm., Vol. 43, No. 2/3/4, February/March/April 1995, pp. 354–364. PSP-based MLSE may have some limitations when used for blind acquisition. It was demonstrated by Chugg in "*Acquisition Performance of Blind Sequence Detectors Using Per-Survivor Processing*", IEEE VTC Proceedings, Vol. 2, May 1997, pp. 539–543, that the probability of acquisition of PSP-based MLSE receivers can be enhanced significantly by resorting to an extended data sequence search. A cause of mis-acquisitions in the single channel case is the existence of what the author refers to as indistinguishable or equivalent sequences. The class includes sequences such as the inverted and shifted versions of the transmitted data sequence. In order to improve the performance of single user acquisition, Chugg proposed to minimize the number of sequences eliminated during the early stages of convergence in a generalized PSP algorithm.

Generalized PSP is the concept of per-path parallel feedback extended to an arbitrary tree search algorithm. Two main approaches in the class of breadth-first type tree search algorithms are the multiple state PSP technique and the multiple survivor PSP technique. The first approach increases the number of survivor paths maintained by constructing a trellis based on a memory length L' in place of L such that L'>L. The latter approach, on the other hand, allows an arbitrary number of survivor paths P to be maintained (where P>$M^L$, M is size of the symbol alphabet). Like the M-algorithm, survivor paths in a multiple survivor PSP algorithm are extended to PM paths of which P are kept based on the accumulated metric.

In the present invention, generalized PSP techniques are extended for use with multiple user signals. The blind acquisition of multiple co-channels may be more difficult than single channel acquisition. In a PSP based joint MLSE receiver, mis-acquisitions may be caused by transmitted co-channel sequences that happen to be highly correlated over a large enough window of overlapping symbol positions. Thus, when co-channel signals are not synchronized, generalized PSP may be used for joint channel acquisition.

Joint medium response estimator 308 according to the present invention estimates co-channel medium responses jointly using a generalized PSP algorithm. A preferred embodiment of joint medium response estimator 308 is described by the flowchart in FIG. 5. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps such as is described in FIG. 5, or by combinations of special purpose hardware and computer instructions.

Figure 5:
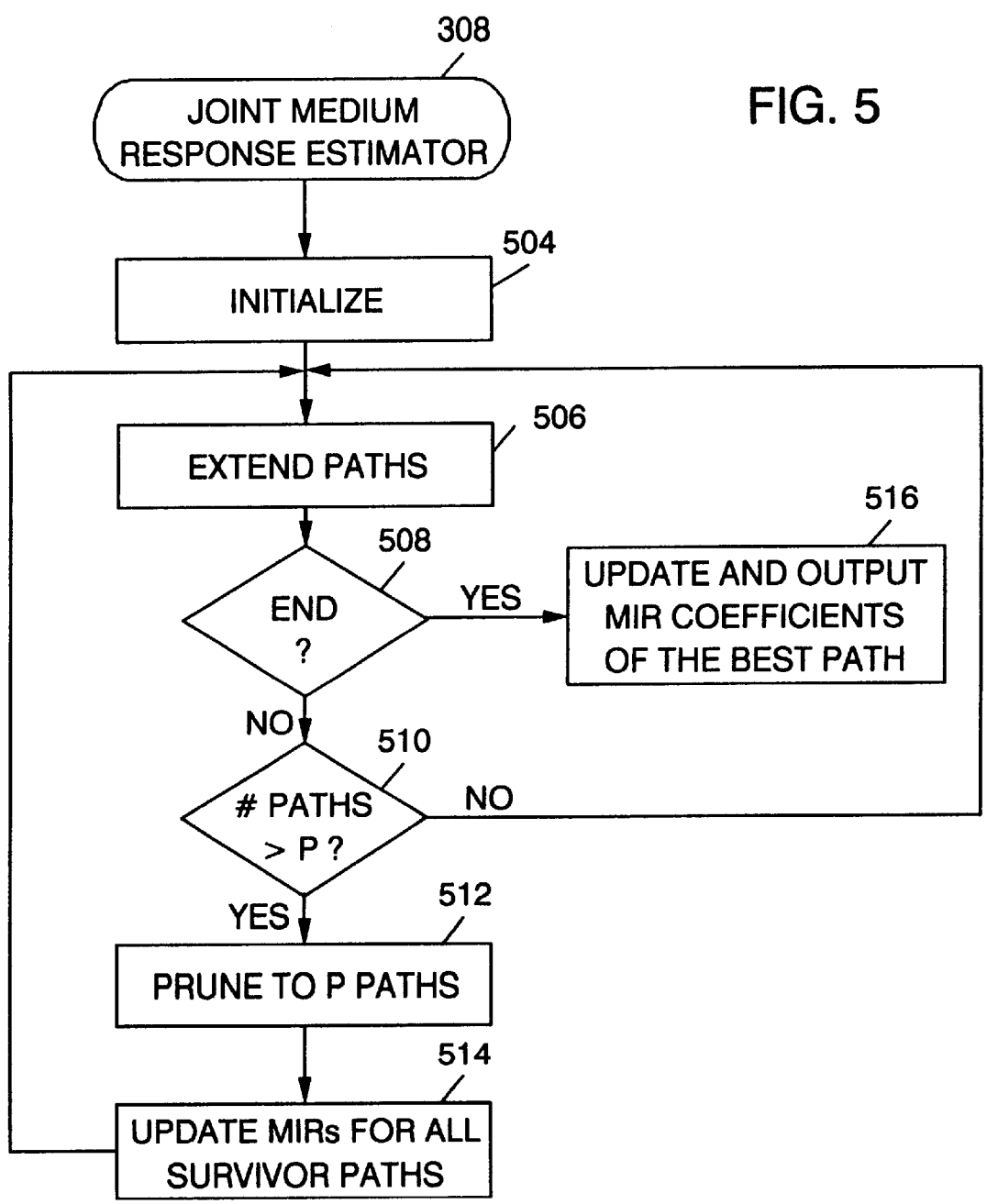
FIG. 5 illustrates a flowchart of joint medium response estimating according to the present invention.

Referring to FIG. 5, initialize Block 504 initializes the medium impulse responses (MIRs) for all co-channel signals. For example, they can be initialized to their least squares estimates found using the corresponding, training sequences individually. These estimates are then refined by carrying out a semi-blind multiple survivor search over the data samples corresponding to the training sequence of the desired signal. The extend paths Block 506 extends survivor paths which represent hypotheses for the interfering symbols. The new accumulated metrics are computed for the extended paths based on the known symbols of the desired signal, the hypothesized symbols of the interfering signal and the predicted medium response coefficients. If the end of the acquisition field has not yet been reached, as indicated by the end Block 508 and the number of paths extended exceeds the number of paths desired as indicated by the #Paths>P Block 510, paths are pruned by Block 512 based on the accumulated metric using Equation (5). Pruning is not performed if the number of paths extended is less than or equal to that desired. MIR coefficients are updated for each survivor path using the LMS or the RLS approach in Block 514 and operations return to extending paths in Block 506. When the end of the acquisition period is reached, Block 516 outputs the updated MIR coefficients corresponding to the path with the best accumulated metric.

Figure 6:
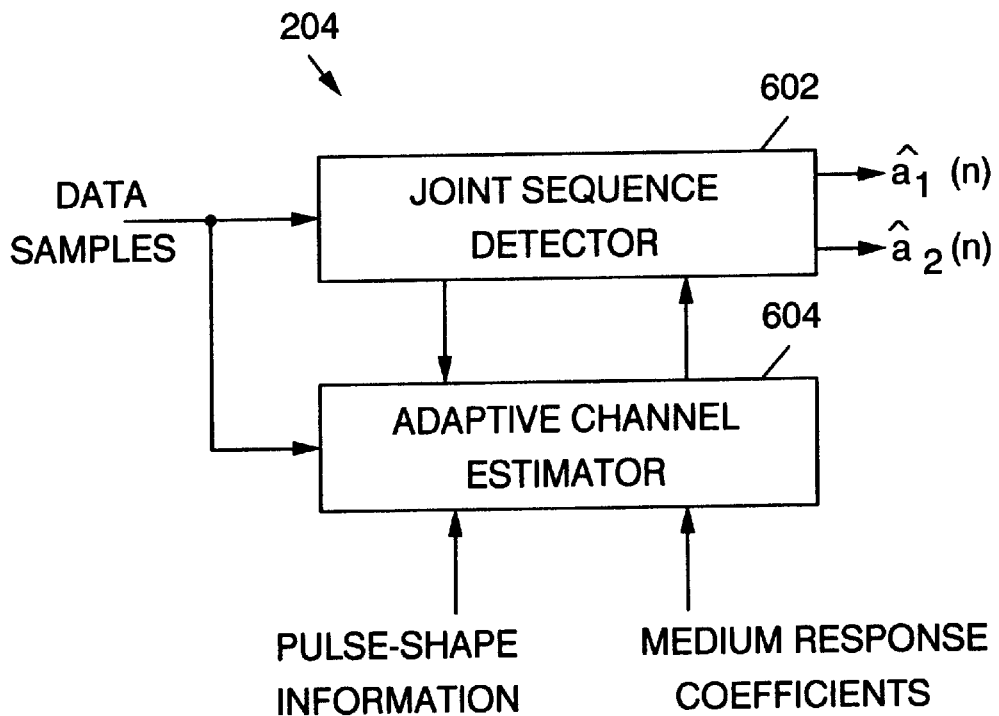
FIG. 6 illustrates an embodiment of demodulation according to the present invention.

Once the co-channel signals have been acquired in acquisition 202 of FIG. 2, the signals are jointly demodulated adaptively in demodulation 204. FIG. 6 shows an exemplary embodiment of demodulation 204 according to the present invention. It includes a joint sequence detector 602 and an adaptive channel estimator 604. The sequence of data samples obtained at the output of sampler 304 in acquisition is provided to joint sequence detector 602 and adaptive channel estimator 604. Pulse-shaping information and medium response coefficients obtained in acquisition are coupled to two inputs of adaptive channel estimator 604. Joint sequence detector 602 provides hypothesized symbol values to adaptive channel estimator 604, which provides the sequence detector with updated channel estimates. Joint sequence detector 602 outputs estimates of the sequences transmitted.

Joint sequence detector 602 finds the joint maximum likelihood estimate of co-channel sequences based on the discrete-time symbol-spaced model of Equation (2). This may be done recursively using Equations (5) and (7). Medium response estimates to compute branch metrics in Equation (7) are provided by adaptive channel estimator 604, which updates MIR coefficients recursively using Equation (8), conditioned on the state (or the survivor path) of joint sequence detector 602. MIR coefficients are initialized to the estimates obtained by joint medium response estimator 308.

Figure 7:
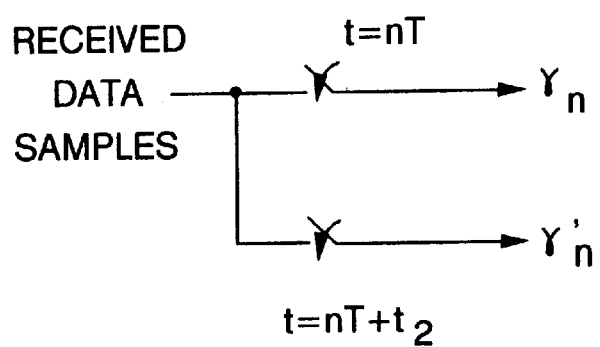
FIG. 7 illustrates an alternative embodiment of sampling according to the present invention.

The receiver described in the above exemplary embodiment makes use of symbol-spaced samples of the received signal (obtained at the timing of the desired signal) for channel acquisition and demodulation. An alternative receiver constructed according to the present invention utilizes samples obtained at the timing of all signals. The sampler in this alternative embodiment is shown in FIG. 7 for the case of two co-channel signals.

Similar to the model for data samples obtained at desired signal timing per Equation (2), the sequence of data samples obtained at the interfering signal's timing (in the case of flat faded signals) can be modeled as $$r'_n = g_n^H \Phi' \underline{\alpha}'_n + w'_n \tag{9}$$

where $w'_n$ is a sample of an additive white Gaussian noise process with zero mean and finite variance, $\alpha'_n = (a_1(n+1), a_1(n), a_1(n-1), a_2(n))^T$ and $\Phi'$ is given by $$\Phi' = \begin{bmatrix} \rho^*_{2,1} & \rho^*_{2,0} & \rho^*_{2,-1} & 0 \\ 0 & 0 & 0 & 1 \end{bmatrix} \tag{10}$$

where it is assumed that the sampled autocorrelation function for the first signal is also modeled completely using three values. Noise processes $\{w_n\}$ and $\{w'_n\}$ are correlated with sample covariance $E[w_n w'^*_n] = \rho_{2,j}$.

The information contained in the two sequences of data samples can be extracted optimally, for example by extending to adaptive multi-user joint estimation the Ungerboeck formulation for maximum likelihood sequence estimation as described in the paper G. Ungerboeck, "*Adaptive Maximum Likelihood Receiver for Carrier Modulated Data Transmission Systems*", IEEE Trans. Comm., Vol. COM-22, May 1974, pp., 624–635. The joint maximum likelihood sequence is determined as the sequence $\{\hat{a}_1(n), \hat{a}_2(n)\}_{n=1}^N$ that maximizes the metric:

$$\Lambda_N = \sum_{n=1}^N M(n) \tag{11}$$

where M(n) are branch metrics, given by $$M(n) = \text{Re}\{\hat{a}_1^*(n)(2y_1(n) - \hat{a}_1(n)|g_1(n)|^2 - 2\hat{a}_2(n-1)s_{-1}^*(n))\} + \tag{12}$$
$$\text{Re}\{\hat{a}_2^*(n)(2y_2(n) - \hat{a}_2(n)|g_2(n)|^2 - 2\hat{a}_1(n)s_0(n) - 2\hat{a}_1(n-1)s_1(n))\}$$

where $y_1(n) = g^*_1(n)r_n, y_2(n) = g^*_2(n)r'_n$ and $s_j(n) = g_1(n)g^*_2(n)$ $\rho_{2,j}$. The state at time n is given by $\beta_n = \{\hat{a}_1(n-1), \hat{a}_2(n-1)\}$. The metric in Equation (11) can be computed recursively, for example by using a trellis search algorithm with Viterbi pruning or a tree search algorithm with or without M-algorithm type pruning. Also, for MPSK and modulations in which all symbols have the same amplitude, the terms proportional to $|g_1(n)|^2$ and $|g_2(n)|^2$ may be omitted from Equation (12).

In order to describe adaptive channel estimation, Equations (2) and (9) can be combined as:

$$\underline{r}_n = \underline{g}_n^H \Psi \hat{A}_n + \underline{w}_n$$

where $$\underline{r}_n = [r_n, r'_n], \underline{w}_n = [w_n, w'_n], \Psi = [\Phi, \Phi']$$

and $$\hat{A}_n = \begin{bmatrix} a_1(n) & a_2(n+1) & a_2(n) & a_2(n-1) & 0 & 0 & 0 & 0 \\ 0 & 0 & 0 & 0 & a_1(n+1) & a_1(n) & a_1(n-1) & a_2(n) \end{bmatrix}^T \tag{14}$$

Define the error corresponding to transitions $\beta_{n-1} \to \beta_n$ in the MLSE processor as $$\underline{e}(\beta_n|\beta_{n-1}) = \underline{r}_{n-1} - \hat{\underline{g}}_{n-1}^H(\beta_{n-1}) \Psi \hat{A}_{n-1} \tag{15}$$

The medium response can then be updated using, for example, the LMS method as $$\hat{\underline{g}}_n(\beta_n) = \hat{\underline{g}}_{n-1}(\beta_{n-1}) + \mu \Psi \hat{A}_{n-1} \underline{e}^H(\beta_n|\beta_{n-1}) \tag{16}$$

The estimates obtained for time n, $\hat{\underline{g}}_n(\beta_n)$ can be used as approximate estimates for time n+1. Alternatively, the estimates for time n+1 can be obtained by extrapolating $\hat{\underline{g}}_n(\beta_n)$.

Joint medium response estimator 308 in the alternative embodiment estimates co-channel medium responses jointly using a generalized PSP algorithm based on the error as defined above. Joint sequence detector 602 in the alternative embodiment finds the sequence that maximizes the metric of Equation (11) recursively. Medium response estimates needed to compute branch metrics in Equation (12) are provided by adaptive channel estimator 604, which updates MIR coefficients recursively using Equation (16), conditioned on the state of joint sequence detector 602. MIR coefficients are initialized to the estimates obtained by joint medium response estimator 308.

Two preferred embodiments of the present invention have been described for the case of two non-dispersive co-channel signals. It will be understood by those skilled in the art that the present invention may be used for more than two dispersive co-channel signals. One skilled in the art will also appreciate that various modifications can be made to fit particular needs. For example, signal timing can be estimated in many alternative ways. When the receiver knows the training sequence of the desired signal only or it is not feasible or reliable to employ the training sequences of the interfering signals, their timing can be hypothesized and estimated jointly along with the medium responses over the desired signal's training sequence. Alternatively, in the case of a single non-dispersive and synchronized interfering signal, the timing can be estimated by subtracting the desired signal component from the data samples and identifying power peaks in the residual signal.

In the absence of a priori information on the interfering signal's co-channel responses, the joint channel estimator can be initialized to zero corresponding to each interfering signal. In this case, it is possible to constrain the first hypothesized symbol for each interfering signal to an arbitrary choice. This is because the remaining hypotheses can lead to channel estimates which are equally-likely phase-rotated versions of the estimates corresponding to the choice and can thus be eliminated. In the case of a single non-dispersive and synchronized interfering signal, the initial channel response for the interfering signal can be found by subtracting the desired signal component from the data signal. The amplitude of the interfering signal can be initialized as the average amplitude of the residual signal while its phase can be initialized as the phase of the first component of the residual signal. Joint channel estimation can also be performed in a multi-pass fashion where the channel estimates obtained in the first pass are used to initialize the estimator for the second pass and so on.

In the case when pulse-shape side information is not available to the receiver or signal timings can not be reliably estimated, it is possible to acquire and track the joint overall channel responses rather than the medium responses. If the channels vary slowly over the burst, it may be desirable to freeze the medium or overall channel responses after acquisition and use them for demodulation without tracking.

Receivers can be modified to operate on fractionally-spaced samples obtained at the timing(s) of all (or the desired) co-channel signal(s). They can also be modified to operate on fractionally-spaced samples obtained at an arbitrary timing. In the case of multiple data samples per symbol, it is possible to use the Euclidean distance metric instead of the Ungerboeck metric of Equation (11) by ignoring noise correlation.

Symbol detection also includes generation of "soft" information, when needed for further processing, such as error correction decoding. It is well known how soft information may be extracted from an MLSE-based receiver using, for example, the SOVA algorithm or its derivatives.

While the invention has been described with regard to single antenna reception, it will be understood to one of ordinary skill that the invention can be used with reception on multiple antennas. With multiple receive antennas, there may be multiple receive signals, one corresponding to each antenna. Pre-combining of antenna signals also may be performed, such as beamforming, so that the multiple receive signals corresponding to multiple beam signals. The invention can be used with metric combining, as disclosed in U.S. Pat. No. 5,191,598 to Backström et al. It can also be used with Interference Rejection Combining (IRC), as disclosed in U.S. Pat. No. 5,680,419 to Bottomley, the disclosure of which is incorporated herein by reference in its entirety. With IRC, error values from multiple antennas are combined using an estimate of impairment correlation properties, also referred to as an impairment correlation estimate. With joint user demodulation, the impairment corresponds to noise plus interference with users not accounted for in channel estimation. With metric combining, a weighted sum of error-squared values is formed.

With multiple antennas, the present invention also can be used with an approach for canceling interference in channel estimation, as described in pending U.S. application Ser. No. 08/689,584 to Bottomley, the disclosure of which is incorporated herein by reference in its entirety. The error signals from multiple antennas are used together, with an impairment estimate, to estimate the channel responses corresponding to the different antennas together. With the present invention, the channel response for each antenna can include the responses associated with multiple user signals In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A receiver comprising:
   means for estimating a plurality of timings for at least one received signal, the plurality of timings corresponding to a plurality of different transmitted signals having different symbol sequences;
   means for sampling the at least one received signal in accordance with the plurality of timings corresponding to a plurality of different transmitted signals having different symbol sequences, to produce a plurality of sample streams;
   means for producing channel estimates for the plurality of transmitted signals;
   means for computing metrics using the sample streams and the channel estimates; and
   means for detecting information symbols corresponding to the plurality of transmitted signals, using the metrics.

2. A receiver according to claim 1 wherein the means for estimating comprises means for correlating the at least one received signal to at least one symbol sequence.

3. A receiver according to claim 1:
   wherein the means for estimating comprises means for hypothesizing a timing; and
   wherein means for computing comprises means for computing metrics that are associated with the hypothesized timing.

4. A receiver according to claim 1 wherein the means for sampling comprises means for obtaining a single sample per symbol period of the at least one received signal in accordance with the plurality of timings to produce the plurality of sample streams.

5. A receiver according to claim 1 wherein the means for sampling comprises means for obtaining a plurality of samples per symbol period of the at least one received signal in accordance with the plurality of timings to produce the plurality of sample streams.

6. A receiver according to claim 1 wherein the means for producing channel estimates comprises:
   means for generating pulse-shape information; and
   means for producing channel estimates for the plurality of transmitted signals using the at least one received signal and the pulse-shape information.

7. A receiver according to claim 1 wherein the means for producing channel estimates comprises means for producing channel estimates that are associated with a plurality of symbol sequence hypotheses.

8. A receiver according to claim 1 wherein the means for producing channel estimates comprises means for updating channel estimates using an error signal.

9. A receiver according to claim 1 wherein the means for computing metrics comprises:
   means for filtering the sample streams with the channel estimates to produce a plurality of filter outputs; and
   means for computing metrics using the filter outputs.

10. A receiver according to claim 1 wherein the means for computing metrics comprises:
    means for estimating received values using the channel estimates and hypothesized symbols; and
    means for computing metrics using the estimated received values.

11. A receiver according to claim 1 wherein the means for detecting comprises:
    means for storing path information that is associated with a plurality of paths;
    means for extending the paths by hypothesizing symbol values and computing metrics; and
    means for discarding paths based on the metrics.

12. A receiver according to claim 11 wherein the means for discarding paths comprises means for discarding paths based on the metrics and a state space.

13. A receiver according to claim 1 wherein the means for computing metrics comprises:
    means for estimating impairment correlation among receive antennas to produce an impairment correlation estimate; and
    means for computing metrics using the sample streams, the channel estimates, and the impairment correlation estimate.

14. A receiver according to claim 13 wherein the means for producing channel estimates comprises means for producing channel estimates using the impairment correlation estimate.

15. A receiver comprising:
    means for generating pulse-shape information for at least one received signal;
    means for producing channel estimates for a plurality of different transmitted signals having different symbol sequences, using the at least one received signal and the pulse-shape information;
    means for computing metrics using the at least one received signal and the channel estimates; and
    means for detecting information symbols corresponding to the plurality of transmitted signals having different symbol sequences, using the metrics.

16. A receiver according to claim 15 wherein the means for producing channel estimates comprises means for producing channel estimates that are associated with a plurality of symbol sequence hypotheses.

17. A receiver according to claim 15 wherein the means for producing channel estimates comprises means for updating channel estimates using an error signal.

18. A receiver according to claim 15 wherein the means for computing metrics comprises:
    means for filtering the at least one received signal with the channel estimates to produce a plurality of filter outputs; and
    means for computing metrics using the filter outputs.

19. A receiver according to claim 15 wherein the means for computing metrics comprises:
   means for estimating received values using the channel estimates and hypothesized symbols; and
   means for computing metrics using the estimated received values.

20. A receiver according to claim 15 wherein the means for detecting comprises:
   means for storing path information that is associated with a plurality of paths;
   means for extending the paths by hypothesizing symbol values and computing metrics; and
   means for discarding paths based on the metrics.

21. A receiver according to claim 20 wherein the means for discarding paths comprises means for discarding paths based on the metrics and a state space.

22. A receiver according to claim 15 wherein the means for computing metrics comprises:
   means for estimating impairment correlation among receive antennas to produce an impairment correlation estimate; and
   means for computing metrics using each received signal, the channel estimates, and the impairment correlation estimate.

23. A receiver according to claim 22 wherein the means for producing channel estimates comprises means for producing channel estimates using received signal, the pulse-shape information, and the impairment correlation estimate.

24. A receiver comprising:
   means for estimating a plurality of timings for at least one received signal, the plurality of timings corresponding to a plurality of different transmitted signals having different symbol sequences;
   means for sampling the at least one received signal in accordance with the plurality of timings corresponding to a plurality of different transmitted signals having different symbol sequences, to produce a plurality of sample streams;
   means for initializing channel estimates for the plurality of transmitted channels and for initializing metrics;
   means for computing updated metrics using the sample streams the initialized channel estimates and the initialized metrics;
   means for detecting information symbols corresponding to at least one of the transmitted signals, using the updated metrics; and
   means for updating the channel estimates using the updated metrics.

25. A receiver according to claim 24 wherein the means for estimating comprises means for correlating the at least one received signal to at least one symbol sequence.

26. A receiver according to claim 24:
   wherein the means for estimating comprises means for hypothesizing a timing; and
   wherein the means for computing comprises means for computing updated metrics that are associated with the hypothesized timing.

27. A receiver according to claim 24 wherein the means for sampling comprises means for obtaining a single sample per symbol period of the at least one received signal in accordance with the plurality of timings to produce a plurality of sample streams.

28. A receiver according to claim 24 wherein the means for sampling comprises means for obtaining a plurality of samples per symbol period of the at least one received signal in accordance with the plurality of timings to produce a plurality of sample streams.

29. A receiver according to claim 24 wherein the means for initializing channel estimates comprises:
   means for generating pulse-shape information; and
   means for initializing channel estimates using the pulse-shape information.

30. A receiver according to claim 24 wherein the means for initializing channel estimates comprises means for initializing channel estimates for a plurality of symbol sequence hypotheses.

31. A receiver according to claim 24 wherein the means for updating channel estimates comprises means for updating channel estimates using an error signal.

32. A receiver according to claim 24 wherein the means for computing metrics comprises:
   means for filtering the sample streams with the channel estimates to produce a plurality of filter outputs; and
   means for computing metrics using the filter outputs.

33. A receiver according to claim 24 wherein the means for computing updated metrics comprises:
   means for estimating received values using the channel estimates, hypothesized symbols and known symbol values; and
   means for computing metrics using the estimated received values.

34. A receiver according to claim 24 wherein the means for detecting comprises:
   means for storing path information that is associated with a plurality of paths;
   means for extending the paths by hypothesizing symbol values and computing metrics; and
   means for discarding paths based on the metrics.

35. A receiver according to claim 34 wherein the means for discarding paths comprises means for discarding paths based on the metrics and a state space.

36. A receiver according to claim 24 wherein the means for initializing comprises means for initializing channel estimates for a selected one of the plurality of channels using the received signal and known symbol values.

37. A receiver according to claim 24 wherein the means for initializing comprises means for initializing channel estimates for an interfering signal using the received signal and channel estimates of a desired signal.

38. A receiver according to claim 24 wherein the means for initializing comprises means for initializing metrics for a predetermined symbol value for at least one interfering symbol sequence.

39. A method of receiving at least one signal that corresponds to a plurality of different transmitted signals having different symbol sequences, comprising the steps of:
   estimating a plurality of timings for the at least one received signal, the plurality of timings corresponding to the plurality of different transmitted signals having different symbol sequences;
   sampling the at least one received signal in accordance with the plurality of timings to produce a plurality of sample streams;
   producing channel estimates for the plurality of transmitted signals;
   computing metrics using the sample streams and the channel estimates; and
   detecting information symbols corresponding to the plurality of transmitted signals, using the metrics.

40. A method according to claim 39 wherein the estimating step comprises the step of correlating the at least one received signal to at least one symbol sequence.

41. A method according to claim 39:
wherein the step of estimating comprises the step of hypothesizing a timing; and
wherein the step of computing comprises the step of computing metrics that are associated with the hypothesized timing.

42. A method according to claim 39 wherein the step of sampling comprises the step of obtaining a single sample per symbol period of the at least one received signal in accordance with the plurality of timings to produce the plurality of sample streams.

43. A method according to claim 39 wherein the step of sampling comprises the step of obtaining a plurality of samples per symbol period of the at least one received signal in accordance with the plurality of timings to produce the plurality of sample streams.

44. A method according to claim 39 wherein the step of producing channel estimates comprises the steps of:
generating pulse-shape information; and
producing channel estimates for the plurality of transmitted signals using the at least one received signal and the pulse-shape information.

45. A method according to claim 39 wherein the step of producing channel estimates comprises the step of producing channel estimates that are associated with a plurality of symbol sequence hypotheses.

46. A method according to claim 39 wherein the step of producing channel estimates comprises the step of updating channel estimates using an error signal.

47. A method according to claim 39 wherein the step of computing metrics comprises the steps of:
filtering the sample streams with the channel estimates to produce a plurality of filter outputs; and
computing metrics using the filter outputs.

48. A method according to claim 39 wherein the step of computing metrics comprises the steps of:
estimating received values using the channel estimates and hypothesized symbols; and
computing metrics using the estimated received values.

49. A method according to claim 39 wherein the step of detecting comprises the steps of:
storing path information that is associated with a plurality of paths;
extending the paths by hypothesizing symbol values and computing metrics; and
discarding paths based on the metrics.

50. A method according to claim 49 wherein the step of discarding paths comprises the step of discarding paths based on the metrics and a state space.

51. A method according to claim 39 wherein the step of computing metrics comprises the steps of:
estimating impairment correlation among receive antennas to produce an impairment correlation estimate; and
computing metrics using the same streams, the channel estimates, and the impairment correlation estimate.

52. A receiver according to claim 51 wherein the step of producing channel estimates uses the impairment correlation estimate.

53. A method of receiving at least one signal that corresponds to a plurality of different transmitted signals having different symbol sequences, comprising the steps of:
generating pulse-shape information for the at least one received signal;
producing channel estimates for the plurality of different transmitted signals having different symbol sequences, using the at least one received signal and the pulse-shape information;
computing metrics using the at least one received signal and the channel estimates; and
detecting information symbols corresponding to the plurality of transmitted signals, using the metrics.

54. A method according to claim 53 wherein the step of producing channel estimates comprises the step of producing channel estimates that are associated with a plurality of symbol sequence hypotheses.

55. A method according to claim 53 wherein the step of producing channel estimates comprises the step of updating channel estimates using an error signal.

56. A method according to claim 53 wherein the step of computing metrics comprises the steps of:
filtering the at least one received signal with the channel estimates to produce a plurality of filter outputs; and
computing metrics using the filter outputs.

57. A method according to claim 53 wherein the step of computing metrics comprises the steps of:
estimating received values using the channel estimates and hypothesized symbols; and
computing metrics using the estimated received values.

58. A method according to claim 53 wherein the step of detecting comprises the steps of:
storing path information that is associated with a plurality of paths;
extending the paths by hypothesizing symbol values and computing metrics; and
discarding paths based on the metrics.

59. A method according to claim 58 wherein the step of discarding paths comprises the step of discarding paths based on the metrics and a state space.

60. A method according to claim 54 wherein the step of computing metrics comprises the steps of:
estimating impairment correlation among receive antennas to produce an impairment correlation estimate; and
computing metrics using each received signal, the channel estimates, and the impairment correlation estimate.

61. A receiver according to claim 60 wherein the step of producing channel estimates uses each received signal, pulse-shape information, and the impairment correlation estimate.

62. A method of receiving at least one signal that corresponds to a plurality of different transmitted signals having different symbol sequences, comprising the steps of:
estimating a plurality of timings for the at least one received signal, the plurality of timings corresponding to the plurality of different transmitted signals having different symbol sequences;
sampling the at least one received signal in accordance with the plurality of timings to produce a plurality of sample streams;
initializing channel estimates for the plurality of transmitted channels and initializing metrics;
computing updated metrics using the sample streams, the initialized channel estimates and the initialized metrics;
detecting information symbols corresponding to at least one of the transmitted signals, using the updated metrics; and
updating the channel estimates using the updated metrics.

63. A method according to claim 62 wherein the step of estimating comprises the step of correlating the at least one received signal to at least one symbol sequence.

64. A method according to claim 62:

wherein the step of estimating comprises the step of hypothesizing a timing; and wherein the step of computing comprises the step of computing updated metrics that are associated with the hypothesized timing.

65. A method according to claim 62 wherein the step of sampling comprises the step of obtaining a single sample per symbol period of the at least one received signal in accordance with the plurality of timings to produce a plurality of sample streams.

66. A method according to claim 62 wherein the step of sampling comprises the step of obtaining a plurality of samples per symbol period of the at least one received signal in accordance with the plurality of timings to produce a plurality of sample streams.

67. A method according to claim 62 wherein the step of initializing channel estimates comprises the steps of:

generating pulse-shape information; and initializing channel estimates using the pulse-shape information.

68. A method according to claim 62 wherein the step of initializing channel estimates comprises the step of initializing channel estimates for a plurality of symbol sequence hypotheses.

69. A method according to claim 62 wherein the step of updating channel estimates comprises the step of updating channel estimates using an error signal.

70. A method according to claim 62 wherein the step of computing metrics comprises the steps of:

filtering the sample streams with the channel estimates to produce a plurality of filter outputs; and computing metrics using the filter outputs.

71. A method according to claim 62 wherein the step of computing updated metrics comprises the steps of:

estimating received values using the channel estimates, hypothesized symbols and known symbol values; and computing metrics using the estimated received values.

72. A method according to claim 62 wherein the step of detecting comprises:

storing path information that is associated with a plurality of paths;

extending the paths by hypothesizing symbol values and computing metrics; and discarding paths based on the metrics.

73. A method according to claim 72 wherein the step of discarding paths comprises the step of discarding paths based on the metrics and a state space.

74. A method according to claim 62 wherein the step of initializing comprises the step of initializing channel estimates for a selected one of the plurality of channels using the at least one received signal and known symbol values.

75. A method according to claim 62 wherein the step of initializing comprises the step of initializing channel estimates for an interfering signal using the at least one received signal and channel estimates of a desired signal.

76. A method according to claim 62 wherein the step of initializing comprises the step of initializing metrics for a predetermined symbol value for at least one interfering symbol sequence.

77. A method according to claim 62 wherein the steps of initializing channel estimates, computing updated metrics, detecting information symbols and updating the channel estimates are repeatedly performed to refine the channel estimates.

78. A received according to claim 1 in combination with a plurality of transmitters, a respective one of which transmits a different one of the plurality of different transmitted signals having different symbol sequences.

79. A received according to claim 15 in combination with a plurality of transmitters, a respective one of which transmits a different one of the plurality of different transmitted signals having different symbol sequences.

80. A received according to claim 24 in combination with a plurality of transmitters, a respective one of which transmits a different one of the plurality of different transmitted signals having different symbol sequences.

81. A method according to claim 39 wherein the estimating is preceded by transmitting a different one of the different transmitted signals having different symbol sequences from a respective one of a plurality of transmitters.

82. A method according to claim 53 wherein the estimating is preceded by transmitting a different one of the different transmitted signals having different symbol sequences from a respective one of a plurality of transmitters.

83. A method according to claim 62 wherein the estimating is preceded by transmitting a different one of the different transmitted signals having different symbol sequences from a respective one of a plurality of transmitters.

* * * * *